United States Patent [19]

Ziegenfuss

[11] Patent Number: 4,621,797

[45] Date of Patent: Nov. 11, 1986

[54] DEVICE FOR ORIENTING AN OBJECT ON A FLAT SURFACE

[75] Inventor: Edward T. Ziegenfuss, East Petersburg, Pa.

[73] Assignee: RCA Corporation, Princeton, N.J.

[21] Appl. No.: 785,995

[22] Filed: Oct. 10, 1985

[51] Int. Cl.[4] ................................................ B23Q 3/08

[52] U.S. Cl. ...................................... 269/34; 269/238; 269/305; 269/908

[58] Field of Search ........... 269/41, 34, 238, 289 MR, 269/908, 303, 305; 445/68; 430/23

[56] References Cited

U.S. PATENT DOCUMENTS 2,422,773 6/1947 Colwill ................................ 269/238
2,689,779 9/1954 Grimm et al. .
2,941,457 6/1960 Weingarten .
2,953,174 9/1960 Wilkins ............................... 269/303
3,395,628 8/1968 Kautz et al. .
3,954,470 5/1976 Barczynski et al. .
4,484,775 11/1984 Norkus ................................ 269/238

*Primary Examiner*—Robert C. Watson
*Attorney, Agent, or Firm*—E. M. Whitacre; D. H. Irlbeck; L. L. Hallacher

[57] ABSTRACT

A device for orienting an object on a flat surface includes two levers which are pivotably coupled to the surface at pivot points between the ends of the levers. An actuating device is supported by and coupled between one end of the levers. The other ends of the levers are free to urge the object into the desired orientation and location upon energization of the actuating device.

9 Claims, 2 Drawing Figures

DEVICE FOR ORIENTING AN OBJECT ON A FLAT SURFACE

BACKGROUND

This invention relates generally to orienting objects and particularly to a device for orienting a substantially rectangular object on a substantially flat surface.

There are many instances in industry when it is necessary to accurately orient and locate a substantially rectangular object on a flat surface. An example of such an instant is the production of the phosphor screen on the inside surface of a kinescope faceplate panel. The phosphor screens of kinescopes are composed of triads of phosphors each of which emits a different color of light when impacted by electrons. The screens are produced by coating the internal surface of the faceplate panel with a slurry containing one of the phosphors and a light sensitive material. An apertured shadow mask is inserted into the panel and the panel is placed upon an exposure mechanism, commonly called a lighthouse. The lighthouse includes a bright light source which exposes the slurry through the apertures in the shadow mask. This process is repeated for each of the three phosphors. During the operation of a kinescope, electron beams are scanned across the shadow mask and the apertures cause the electron beams to impact a phosphor of the proper color. For this reason, it is critical that the panel be properly oriented and located on the lighthouse during the exposure process because the light passing through the apertures simulates the electron beams passing through the apertures during the operation of the tube. The present invention is directed to a device for accurately orienting and locating a faceplate panel on the flat surface of a lighthouse.

SUMMARY

A device for orienting an object on a flat support surface includes two lever means each of which has an orienting end and an actuated end. The lever means are pivotably coupled to the flat support surface at pivot points between the orienting end and the actuated end. Actuating means is supported by and pivotably coupled to the actuated ends whereby energization of the actuating means pivots the levers and the orienting ends urge any object on the support surface into a desired orientation and location.

DETAILED DESCRIPTION

Figure 2:
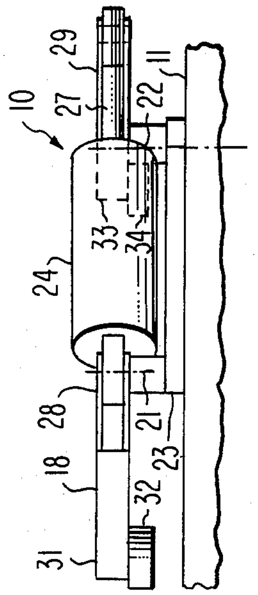
FIG. 2 is a side view of a preferred embodiment of FIG. 1.
Figure 1:
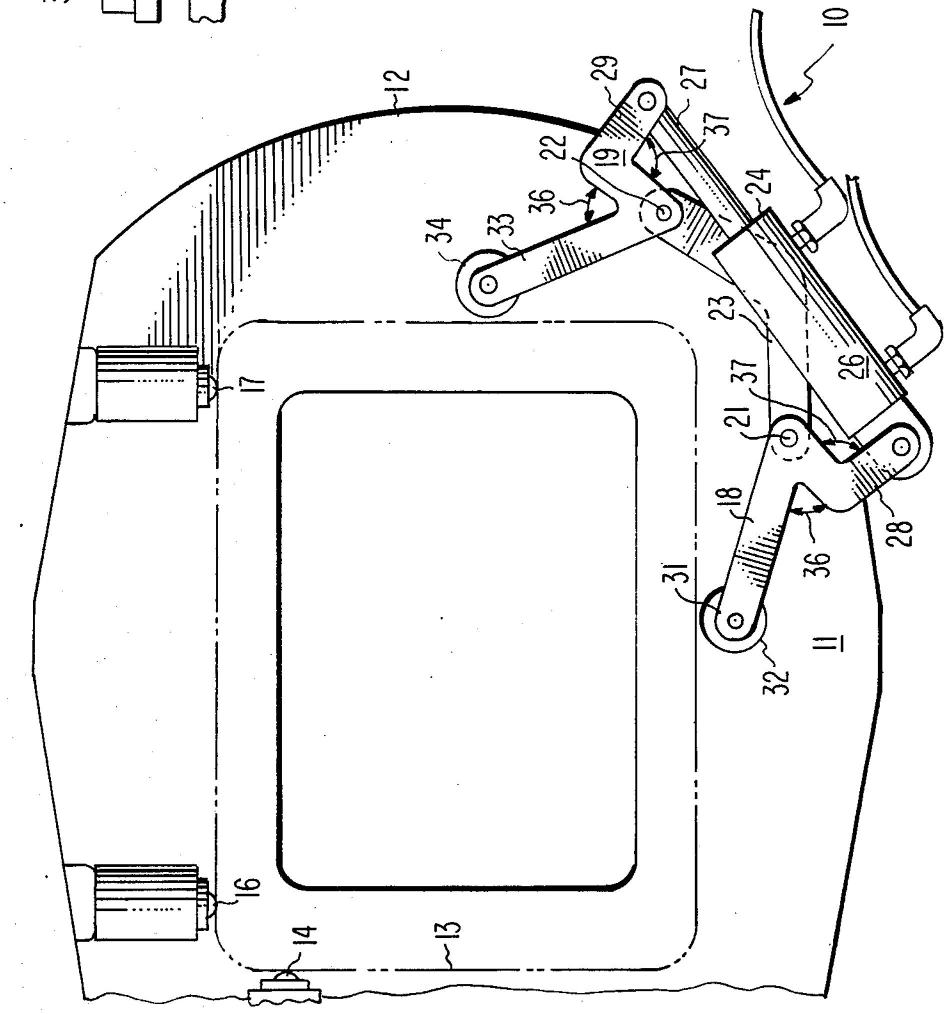
FIG. 1 is a top view of a preferred embodiment arranged on the flat surface of a lighthouse.

In FIGS. 1 and 2, an inventive orienting device 10 is fixed to a flat surface 11 of a lighthouse 12. A faceplate panel 13 (shown in phantom) rests on a flat surface 11 of the lighthouse 12. As explained hereinabove, the proper exposure of the phosphor on the inside surface of the panel 13 requires that the panel be accurately located and oriented on the lighthouse 12. A plurality of guide stops 14, 16 and 17 are permanently affixed to the flat surface 11 of the lighthouse 12. The panel 13 is substantially rectangular and, therefore, the guide stops 14, 16 and 17 are arranged to engage two sides of the panel. Accordingly, by urging a panel into engagement with the three guide stops 14, 16 and 17, the panel is properly oriented and located on the lighthouse to permit the accurate exposure of the phosphor on the inside surface of the panel. The inventive orienting device 10 urges the panel into engagement with the guide stops 14, 16 and 17 for a wide variety of panel sizes and irrespective of the orientation of the panel when the panel is initially placed on the lighthouse.

Two levers 18 and 19 are pivotably mounted to the flat surface 11 at two pivot points 21 and 22, respectively. The pivot points 21 and 22 are located to span the corner of the panel 13 which is diagonally disposed from the corner of the panel which engages the guide stops 14 and 16. A mounting base 23 is used to fix the lever arms 18 and 19 and the pivot points 21 and 23 to the flat surface 11 by use of machine screws (not shown). The use of the mounting base 23 permits easy removal of the orienting device 10 from the lighthouse as a complete unit.

A fluidic cylinder 24, having a chamber 26 and a slideable shaft 27, serves as an actuating means for the levers 18 and 19. The lever 18 is pivotably coupled to the chamber 26 at an actuated end 28 of the lever 18. Similarly, the lever 19 is pivotably coupled to the end of the shaft 27 at an actuated end 29 of the lever 19. Thus, the cylinder 24 is supported solely by the levers 18 and 19, and is free to float when actuated. An orienting end 31 of the lever 18 rotatably supports a roller 32. Similarly, the orienting end 33 of the lever 19 rotatably supports a roller 34. The rollers 32 and 34 engage the sides of the panel and urge the panel against the guide stops 14, 16 and 17 when fluid, such as air, is admitted to the cylinder 24.

The levers 18 and 19 each include oppositely facing angles 36 and 37. These angles permit the lever, which is coupled to the chamber 26, to clear the chamber 26 during the actuation of the device 10. The lever 19, which is coupled to the end of the shaft 27, includes the angles 36 and 37 merely to permit both of the levers to be similarly configured to decrease the number of parts required for the orienting unit 10. The distance between the pivot points 21 and 22 and the centers of the rollers 32 and 34, respectively, exceeds the distance between the pivot points and the actuating ends 28 and 29 of the levers by a predetermined multiple, such as 1.5. This results in a multiplication of the linear motion of the shaft 27.

In operation, a faceplate panel 13 is placed upon the flat surface 11 of lighthouse 12 either manually or by an automatic transfer mechanism. In either event, the panel 13 ordinarily is not precisely located or oriented on the flat surface 11. The fluid cylinder 24 is actuated to extend the shaft 27 outwardly from the chamber 26 to the fully extended position shown in FIG. 1. The cylinder 24 floats with respect to the lighthouse 12 and, accordingly, both of the orienting ends 31 and 33 of the levers 18 and 19 respectively move toward the respective sides of the panel 13. When either of the rollers 32 or 34 first engages the panel 13, the motion of the cylinder 24 assumes the path of least resistance, and the cylinder rotates somewhat and causes the other roller to also engage the panel. The rollers 32 and 34 then gradually urge the panel into engagement with the guide stops 14, 16 and 17. As soon as one of the rollers 32 or 34 has urged the panel into engagement with the guide stops along one side of the panel 13, the other roller continues to engage the other side of the panel 13 and urges the panel until the panel is in full engagement with the guide stops. The actuation of the cylinder 24 can be ceased either by detecting the pressure in the cylinder 24 when the orienting device 10 urges the panel into full engagement with the guide stops 14, 16 and 17, or by any other appropriate mechanism, many of which are known to those skilled in the art.

What is claimed is:

1. A device for orienting an object on a flat support surface comprising:

first lever means having a first orienting end and a first actuated end, said first lever means being pivotably coupled to said flat support surface at a first pivot point between said first orienting end and said first actuated end;

second lever means having a second orienting end and a second actuated end, said second lever means being pivotably coupled to said flat support surface at a second pivot point between said second orienting end and said second actuated end, said first and second pivot points being located to span said object;

actuating means supported by and pivotably coupled to said first and second actuated ends, at least one of said lever means being configured to include opposite facing angles to provide clearance between said at least one lever and said actuating means, whereby energization of said actuating means pivots said first and second levers and said first and second orienting ends urge any object on said support surface into a desired orientation and location.

2. The device of claim 1 wherein said object is substantially rectangular, and wherein said first and second pivot points are arranged to span a corner of said object whereby said orienting ends urge two sides of said object upon energization of said actuating means.

3. The device of claim 2 further including first and second rollers rotatable coupled to said first and second orienting ends, respectively, whereby said lever means contact said object through said rollers.

4. The device of claim 3 wherein said actuating means is a fluid cylinder having a chamber and a slideable shaft, said shaft being coupled to one of said actuated ends and said chamber being coupled to the other of said actuated ends.

5. The device of claim 4 further including a mounting base, said first and second lever means being pivotably coupled to said mounting base at said first and second pivot points respectively, whereby said device is removable from said support surface as a unit.

6. The device of claim 1 wherein the distance between said pivot points and said orienting ends exceeds the distance between said pivot points and actuated ends, whereby motion of actuating means is multiplied by said levers.

7. The device of claim 6 further including first and second rollers rotatably coupled to said first and second orienting ends respectively, whereby said levers contact said object through said rollers.

8. The device of claim 7 wherein said actuating means is a fluid cylinder having a chamber and a slideable shaft, said shaft being coupled to one of said actuated ends and said chamber being coupled to the other of said actuated ends.

9. The device of claim 8 further including a mounting base, said first and second lever means being pivotably coupled to said mounting base at said first and second pivot points respectively, whereby said device is removable from said support surface as a unit.

* * * * *